United States Patent
Wu et al.

(10) Patent No.: US 12,079,708 B2
(45) Date of Patent: Sep. 3, 2024

(54) PARALLEL ACCELERATION METHOD FOR MEMRISTOR-BASED NEURAL NETWORK, PARALLEL ACCELERATION PROCESSOR BASED ON MEMRISTOR-BASED NEURAL NETWORK AND PARALLEL ACCELERATION DEVICE BASED ON MEMRISTOR-BASED NEURAL NETWORK

(71) Applicant: TSINGHUA UNIVERSITY, Beijing (CN)

(72) Inventors: Huaqiang Wu, Beijing (CN); Peng Yao, Beijing (CN); Bin Gao, Beijing (CN); He Qian, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 969 days.

(21) Appl. No.: 17/049,348

(22) PCT Filed: Jan. 10, 2020

(86) PCT No.: PCT/CN2020/071424
§ 371 (c)(1),
(2) Date: Oct. 21, 2020

(87) PCT Pub. No.: WO2021/088248
PCT Pub. Date: May 14, 2021

(65) Prior Publication Data
US 2022/0335278 A1    Oct. 20, 2022

(30) Foreign Application Priority Data
Nov. 7, 2019    (CN) .......................... 201911082236.3

(51) Int. Cl.
*G06N 3/063*    (2023.01)
*G06F 9/30*    (2018.01)
(Continued)

(52) U.S. Cl.
CPC ......... *G06N 3/063* (2013.01); *G06F 9/30036* (2013.01); *G06F 9/345* (2013.01); *G06F 9/3877* (2013.01)

(58) Field of Classification Search
CPC ........ G06N 3/063; G06N 3/0464; G06N 3/09; G06N 3/065; G06N 3/08; G06N 3/084;
(Continued)

(56) References Cited

U.S. PATENT DOCUMENTS 11,003,955 B1 *   5/2021   Tan .................. G06V 20/58
2014/0180989 A1   6/2014   Krizhevsky
(Continued)

FOREIGN PATENT DOCUMENTS

CN   107239824 A   10/2017
CN   107704922 A    2/2018
(Continued)

OTHER PUBLICATIONS

Yakopcic et al., "Extremely parallel memristor crossbar architecture for convolutional neural network implementation," in 2017 International Joint Conference on Neural Networks (IJCNN) (May 2017) (pp. 1696-1703). (Year: 2017).*
(Continued)

*Primary Examiner* — Kc Chen
*Assistant Examiner* — Kuang F Chen
(74) *Attorney, Agent, or Firm* — Loeb & Loeb LLP

(57) ABSTRACT

Disclosed are a parallel acceleration method for a memristor-based neural network, a parallel acceleration processor based on a memristor-based neural network and a parallel acceleration device based on a memristor-based neural network. The neural network includes a plurality of functional layers sequentially provided, wherein the plurality of functional layers include a first functional layer and a second functional layer following the first functional layer, the first
(Continued)

functional layer includes a plurality of first memristor arrays in parallel, and the plurality of first memristor arrays are configured to execute an operation of the first functional layer in parallel and to output a result of the operation to the second functional layer. The parallel acceleration method includes: executing the operation of the first functional layer in parallel via the plurality of first memristor arrays and outputting the result of the operation to the second functional layer.

14 Claims, 6 Drawing Sheets

(51) Int. Cl.
    *G06F 9/345*     (2018.01)
    *G06F 9/38*     (2018.01)

(58) Field of Classification Search
    CPC ..... G06N 3/045; G06F 9/30036; G06F 9/345; G06F 9/3877; Y02D 10/00; G11C 13/0004
    See application file for complete search history.

(56) References Cited

U.S. PATENT DOCUMENTS

| | | | |
|---|---|---|---|
| 2018/0157969 A1 | 6/2018 | Xie | |
| 2019/0236445 A1* | 8/2019 | Das | ................ G06N 3/063 |
| 2020/0082255 A1 | 3/2020 | Kataeva | |
| 2020/0117700 A1* | 4/2020 | Chatterjee | ................ G06N 3/04 |
| 2020/0293889 A1 | 9/2020 | Terasaki | |
| 2020/0342301 A1 | 10/2020 | Miao | |
| 2021/0098611 A1* | 4/2021 | Hersam | ............. G11C 13/0007 |
| 2021/0110235 A1* | 4/2021 | Hoang | ................ G06F 17/15 |
| 2021/0264679 A1* | 8/2021 | Liu | ........................ G06T 7/73 |
| 2021/0326687 A1* | 10/2021 | Liu | ....................... G06N 3/065 |

FOREIGN PATENT DOCUMENTS

| | | |
|---|---|---|
| CN | 108009640 A | 5/2018 |
| CN | 108268938 A | 7/2018 |
| CN | 109460817 A | 3/2019 |
| CN | 109800870 A | 5/2019 |
| JP | H02266458 A | 10/1990 |
| JP | 2018200627 | 12/2018 |
| JP | 2019153254 | 9/2019 |
| WO | 2017139342 A1 | 8/2017 |

OTHER PUBLICATIONS

International Search Report for PCT/CN2020/071424 dated Aug. 5, 2020 (9 pages).

Japanese Office Action issued in App. No. JP2022526246, dated Jul. 18, 2023, 4 pages.

* cited by examiner

PARALLEL ACCELERATION METHOD FOR MEMRISTOR-BASED NEURAL NETWORK, PARALLEL ACCELERATION PROCESSOR BASED ON MEMRISTOR-BASED NEURAL NETWORK AND PARALLEL ACCELERATION DEVICE BASED ON MEMRISTOR-BASED NEURAL NETWORK

The present application is a PCT US National Phase application claiming priority to the PCT International Application PCT/CN2020/071424, filed on Jan. 10, 2020, which claims priority of the Chinese Patent Application No. 201911082236.3 filed on Nov. 7, 2019 and entitled "Parallel Acceleration Method for Memristor-based Neural Network, Parallel Acceleration Processor based on Memristor-Based Neural Network and Parallel Acceleration Device based on Memristor-Based Neural Network", the entire disclosure of which is incorporated herein by reference in its entirety as part of the present application.

TECHNICAL FIELD

Embodiments of the present disclosure relate to a parallel acceleration method for a memristor-based neural network, a parallel acceleration processor based on a memristor-based neural network, and a parallel acceleration device based on a memristor-based neural network.

BACKGROUND

The rise of deep neural network algorithms has brought about an intelligent revolution in information technology. Based on various deep neural network algorithms, image recognition and segmentation, object detection, translation and generation of speech and text, etc., can be realized. Using a deep neural network algorithm to process different workloads is a kind of data-centric computing, and the hardware platform for implementing the algorithm should have processing capability of high performance and low power consumption. However, the conventional hardware platform for implementing the algorithm is based on the von Neumann architecture which separates storage and computation. This architecture requires data to be transferred back and forth between the storage element and the computing element during computation. Therefore, the energy efficiency of this architecture is relatively low in the computation process of the deep neural network containing a large number of parameters. Therefore, it is an urgent problem to develop a new type of computing hardware to run deep neural network algorithms.

SUMMARY

At least one embodiment of the present disclosure provides a parallel acceleration method for a memristor-based neural network, wherein the neural network comprises a plurality of functional layers sequentially provided, the plurality of functional layers comprise a first functional layer and a second functional layer following the first functional layer, the first functional layer comprises a plurality of first memristor arrays in parallel, the plurality of first memristor arrays are configured to execute an operation of the first functional layer in parallel and to output a result of the operation to the second functional layer, and the parallel acceleration method comprises: executing the operation of the first functional layer in parallel via the plurality of first memristor arrays and outputting the result of the operation to the second functional layer.

For example, in the parallel acceleration method provided by some embodiments of the present disclosure, the executing the operation of the first functional layer in parallel via the plurality of first memristor arrays and outputting the result of the operation to the second functional layer comprises: splitting an input data received by the first functional layer into a plurality of sub-input data in one-to-one correspondence with the plurality of first memristor arrays; and executing the operation of the first functional layer on the plurality of sub-input data in parallel via the plurality of first memristor arrays, so as to correspondingly generate a plurality of sub-operation results.

For example, the parallel acceleration method provided by some embodiments of the present disclosure further comprises: concatenating the plurality of sub-operation results and executing an operation of the second functional layer on a concatenate result via the second functional layer.

For example, in the parallel acceleration method provided by some embodiments of the present disclosure, sizes of the plurality of sub-input data are substantially equal to each other.

For example, in the parallel acceleration method provided by some embodiments of the present disclosure, the executing the operation of the first functional layer in parallel via the plurality of first memristor arrays and outputting the result of the operation to the second functional layer comprises: providing a plurality of input data received by the first functional layer to the plurality of first memristor arrays respectively; and executing the operation of the first functional layer on the plurality of input data at least partially in parallel via the plurality of first memristor arrays, so as to correspondingly generate a plurality of sub-operation results.

For example, the parallel acceleration method provided by some embodiments of the present disclosure further comprises: executing an operation of the second functional layer on the plurality of sub-operation results via the second functional layer.

For example, in the parallel acceleration method provided by some embodiments of the present disclosure, the plurality of input data are different from each other.

For example, in the parallel acceleration method provided by some embodiments of the present disclosure, the neural network is a convolutional neural network.

For example, in the parallel acceleration method provided by some embodiments of the present disclosure, the first functional layer is an initial convolution layer of the neural network.

For example, in the parallel acceleration method provided by some embodiments of the present disclosure, the plurality of functional layers further comprise a third functional layer, and an output of the third functional layer is provided to the first functional layer.

For example, in the parallel acceleration method provided by some embodiments of the present disclosure, weight parameters of the neural network are obtained through ex-situ training, the weight parameters of the neural network comprise weight parameters of the first functional layer, and the weight parameters of the first functional layer are written into the plurality of first memristor arrays, so as to determine conductances of the plurality of first memristor arrays.

For example, in the parallel acceleration method provided by some embodiments of the present disclosure, the weight parameters of the neural network further comprise weight parameters of functional layers other than the first functional layer, and the weight parameters of the functional layers other than the first functional layer are written into memristor arrays corresponding to the functional layers other than the first functional layer, so as to determine conductances of the memristor arrays corresponding to the functional layers other than the first functional layer.

At least one embodiment of the present disclosure further provides a parallel acceleration processor based on a memristor-based neural network, wherein the neural network comprises a plurality of functional layers sequentially provided, the plurality of functional layers comprise a first functional layer, the parallel acceleration processor comprises a plurality of memristor array computing units, the plurality of memristor array computing units comprise a plurality of first memristor array computing units, weight parameters of the first functional layer are written into the plurality of first memristor array computing units, and the plurality of first memristor array computing units are configured to execute computing corresponding to an operation of the first functional layer in parallel.

At least one embodiment of the present disclosure further provides a parallel acceleration device based on a memristor-based neural network, which comprises: the parallel acceleration processor provided by any one embodiment of the present disclosure, an input interface and an output interface which are coupled to the parallel acceleration processor, wherein the input interface is configured to receive an instruction to control an operation of the parallel acceleration processor, and the output interface is configured to output a result of the operation of the parallel acceleration processor.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

A memristor (e.g., resistive random access memory, phase change memory, conductive bridge memory, etc.) is a nonvolatile element whose conductance state can be adjusted by applying an external excitation. According to Kirchhoff's current law and Ohm's law, an array formed of such elements can complete parallel multiply-accumulate calculations, and both storage and computing occur in each element of the array. Based on this computing architecture, integrated storage and computing can be realized without a large amount of data transfer. At the same time, multiply-accumulate calculations are the core computing tasks needed to run a neural network. Therefore, by using the conductances of the memristor-typed elements in the array to represent the weight values, an energy-efficient operation of the neural network can be realized based on this integrated storage and computing.

Figure 1:
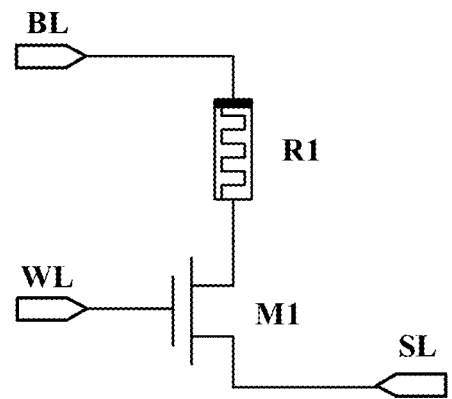
FIG. 1 is a schematic diagram of a memristor unit circuit.

FIG. 1 is a schematic diagram of a memristor unit circuit. As shown in FIG. 1, the memristor unit circuit adopts a 1T1R structure, that is, the memristor unit circuit includes a transistor M1 and a memristor R1.

It should be noted that the transistor adopted in the embodiments of the present disclosure can be a thin film transistor or field effect transistor (e.g., MOS field effect transistor) or any other switching element having the same characteristics. The source and drain of the transistor adopted here can be symmetrical in structure, so the source and drain can be structurally indistinguishable. In the embodiments of the present disclosure, in order to distinguish the two electrodes of the transistor besides the gate, one of them is directly described as a first electrode and the other of them is described as a second electrode.

The type of the transistor adopted in the embodiments of the present disclosure is not limited. For example, in the case where the transistor M1 adopts an N-type transistor, its gate is connected to a word line terminal WL, and for example, the transistor M1 is turned on when the word line terminal WL inputs a high level; the first electrode of the transistor M1 can be a source and configured to be connected to a source line terminal SL, and for example, the transistor M1 can receive a reset voltage through the source line terminal SL; the second electrode of the transistor M1 can be a drain and configured to be connected to a second electrode (e.g., a negative electrode) of the memristor R1, and a second electrode of the memristor R1 is connected to a bit line terminal BL, and for example, the memristor R1 can receive a set voltage through the bit line terminal BL. For example, in the case where the transistor M1 adopts a P-type transistor, its gate is connected to a word line terminal WL, and for example, the transistor M1 is turned on when the word line terminal WL inputs a low level; the first electrode of the transistor M1 can be a drain and configured to be connected to a source line terminal SL, and for example, the transistor M1 can receive a reset voltage through the source line terminal SL; the second electrode of the transistor M1 can be a source and configured to be connected to a second electrode (e.g., negative electrode) of the memristor R1, and a second electrode of the memristor R1 is connected to a bit line terminal BL, and for example, the memristor R1 can receive a set voltage through the bit line terminal BL. It should be noted that the structure of the memristor can also be implemented as any other structure, such as a structure in which the second electrode of the memristor R1 is connected to the source line terminal SL, without being limited in the embodiments of the present disclosure. The following embodiments will be described by taking that the transistor M1 adopts an N-type transistor as an example.

The function of the word line terminal WL is to apply a corresponding voltage to the gate of the transistor M1, so as to control the transistor M1 to be turned on or off. When the memristor R1 is subject to an operation, such as a set operation or a reset operation, the transistor M1 needs to be turned on first, that is, the gate of the transistor M1 needs to be applied with a turn-on voltage through the word line terminal WL. After the transistor M1 is turned on, for example, the resistance state of the memristor R1 can be changed by applying a voltage to the memristor R1 via the source line terminal SL and the bit line terminal BL. For example, a set voltage can be applied through the bit line terminal BL, so that the memristor R1 is in a low resistance state; and for another example, a reset voltage can be applied through the source line terminal SL, so that the memristor R1 is in a high resistance state.

It should be noted that in the embodiments of the present disclosure, by applying a voltage through the word line terminal WL and the bit line terminal BL, the resistance value of the memristor R1 can become smaller and smaller, that is, the memristor R1 changes from a high resistance state to a low resistance state, and the operation of changing the memristor R1 from a high resistance state to a low resistance state is referred to as a set operation; and by applying a voltage through the word line terminal WL and the source line terminal SL, the resistance value of the memristor R1 can become larger and larger, that is, the memristor R1 changes from a low resistance state to a high resistance state, and the operation of changing the memristor R1 from a low resistance state to a high resistance state is referred to as a reset operation. For example, the memristor R1 has a threshold voltage, and in the case where the amplitude of the input voltage is less than the threshold voltage of the memristor R1, the resistance value (or conductance value) of the memristor R1 will not be changed. In this case, by inputting a voltage less than the threshold voltage, the resistance value (or conductance value) of the memristor R1 can be used for calculations; and by inputting a voltage greater than the threshold voltage, the resistance value (or conductance value) of the memristor R1 can be changed.

Figure 2:
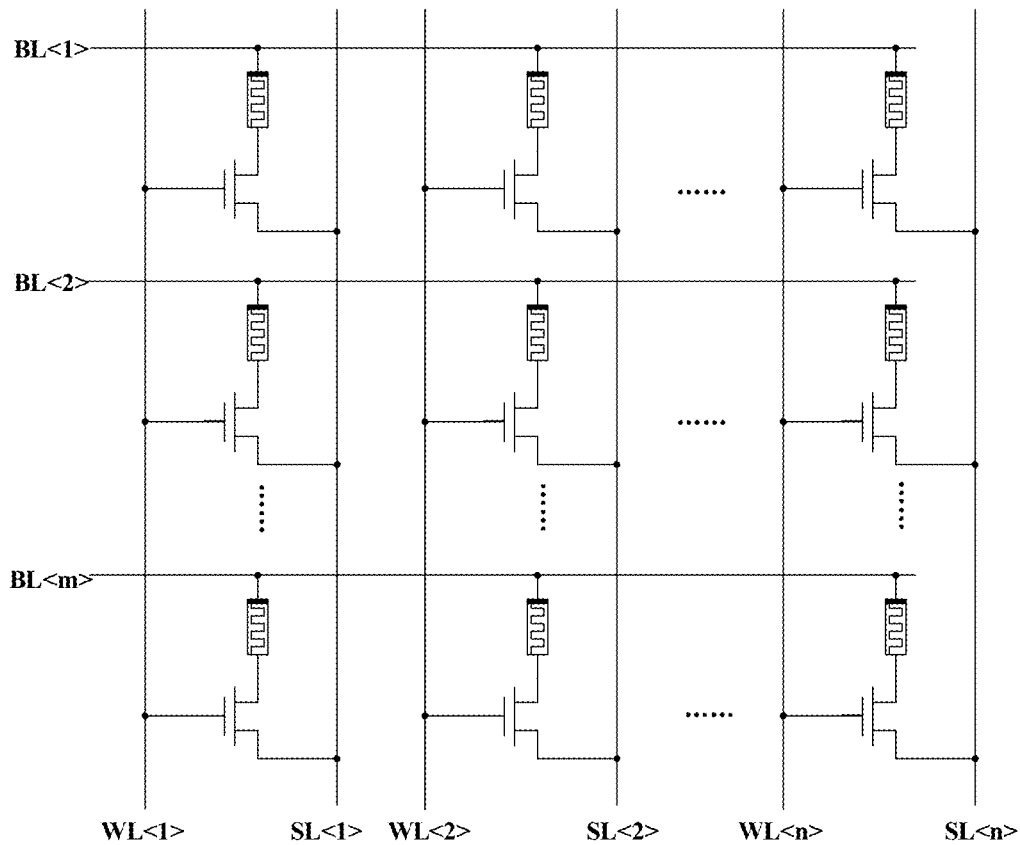
FIG. 2 is a schematic diagram of a memristor array.

FIG. 2 shows a memristor array which is formed of a plurality of memristor unit circuits as shown in FIG. 1. For example, the plurality of memristor unit circuits form an array of m rows and n columns, where m is an integer greater than 1 and n is an integer greater than or equal to 1. In FIG. 2, BL<1>, BL<2>, BL<m> represent a bit line of a first row, a bit line of a second row, . . . , a bit line of an m-th row, respectively, and the memristors in the memristor unit circuits of each row are connected to the bit line corresponding to the each row. In FIG. 2, WL<1>, WL<2>, WL<n> represent a word line of a first column, a word line of a second column, . . . , a word line of an n-th column, respectively, and the gates of the transistors in the memristor unit circuits of each column are connected to the word line corresponding to the each column. In FIG. 2, SL<1>, SL<2>, SL<n> represent a source line of the first column, a source line of the second column, . . . , a source line of the n-th column, respectively, and the sources of the transistors in the memristor unit circuits of each column is connected to the source line corresponding to the each column.

The memristor array of m rows and n columns shown in FIG. 2 can represent a neural network weight matrix of m rows and n columns. For example, a first neuron layer has m neuron nodes, which are correspondingly connected to the bit lines of the m rows of the memristor array shown in FIG. 2; and a second neuron layer has n neuron nodes, which are correspondingly connected to the source lines of the n columns of the memristor array shown in FIG. 2. By inputting voltage excitations to the first neuron layer in parallel, output currents obtained by multiplying a voltage excitation vector and a conductance matrix of the memristor array (conductance is the reciprocal of resistance) can be obtained at the second neuron layer.

Specifically, according to Kirchhoff's law, the output currents of the memristor array can be obtained according to the following formula:

$$i_j = \Sigma_{k=1}^{m}(v_k g_{kj}),$$

where j=1, n, and k=1, m.

In the above formula, $v_k$ represents the voltage excitation input by the neuron node k in the first layer neuron layer, $i_j$ represents the output current of the neuron node j in the second layer neuron layer, and $g_{kj}$ represent the conductance matrix of the memristor array.

According to Kirchhoff's law, the memristor array can complete parallel multiply-accumulate calculations.

It should be noted that, for example, in some examples, each weight of the neural network weight matrix can also be implemented by using two memristors. That is, two columns of memristors in the memristor array can be used to output the output current of one column. In this case, a memristor array of m rows and 2n columns is required to represent a neural network weight matrix of m rows and n columns.

It should be noted that the current output by the memristor array is an analog current. In some examples, the analog current can be converted into a digital voltage via an analog-to-digital conversion circuit (ADC) and then be transmitted to the second neuron layer, and the second neuron layer can convert the digital voltage into an analog voltage via a digital-to-analog conversion circuit (DAC) and be connected with another neuron layer via another memristor array. In some other examples, the analog current can also be converted into an analog voltage by using a sample-and-hold circuit and then be transmitted to the second neuron layer.

A convolutional neural network (CNN) is mainly used to identify two-dimensional shapes, and it is highly invariant to the shifting, scaling, tilting, or other forms of deformation of images. The CNN mainly simplifies the complexity of a neural network model and reduces the number of weights through local perception field and weight sharing. With the development of deep learning technology, the application scope of the CNN is not limited to the field of image recognition. It can also be applied in the fields of face recognition, text recognition, animal classification, and image processing, etc.

Figure 3:
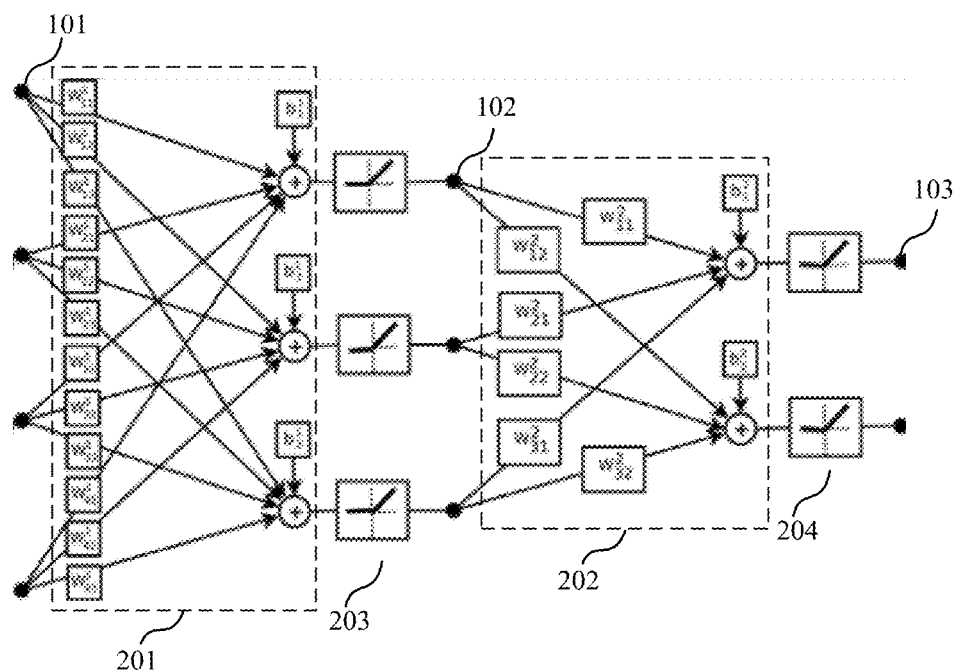
FIG. 3 is a schematic diagram of a convolutional neural network.

FIG. 3 is a schematic diagram of a CNN. For instance, the convolutional neural network can be used for image processing, which uses images as input and output, and replaces scalar weights by convolution kernels. FIG. 3 only shows a CNN having a structure of 3 neuron layers, and the embodiments of the present disclosure are not limited to this case. As shown in FIG. 3, the CNN includes three neuron layers, that is, an input layer 101, a hidden layer 102 and an output layer 103. The input layer 101 has 4 inputs, the hidden layer 102 has 3 outputs, and the output layer 103 has 2 outputs.

For instance, the 4 inputs of the input layer 101 can be 4 images or 4 feature images of 1 image. The 3 outputs of the hidden layer 102 can be feature images of images inputted through the input layer 101.

For instance, as shown in FIG. 3, convolution layers have weight $w_{ij}^k$ and bias $b_i^k$. The weight $w_{ij}^k$ represents a convolution kernel, and the bias $b_i^k$ is a scalar superimposed on the output of the convolution layer, where k is the label of the input layer 101, and i and j are the labels of units of the input layer 101 and units of the hidden layer 102, respectively. For instance, a first convolution layer 201 includes a first set of convolution kernels ($w_{ij}^1$ in FIG. 3) and a first set of bias ($b_i^1$ in FIG. 3). A second convolution layer 202 includes a second set of convolution kernels ($w_{ij}^2$ in FIG. 3) and a second set of bias ($b_i^2$ in FIG. 3). In general, each convolution layer includes dozens or hundreds of convolution kernels. In the case of a deep CNN, the CNN can include at least five convolution layers.

For instance, as shown in FIG. 3, the CNN further includes a first activation layer 203 and a second activation layer 204. The first activation layer 203 is disposed after the first convolution layer 201, and the second activation layer 204 is disposed after the second convolution layer 202. The activation layer (for instance, the first activation layer 203 and the second activation layer 204) includes an activation function. The activation function is used to introduce non-linear factors into the CNN, so that the CNN can solve complex problems better. The activation function can include a rectified linear unit (ReLU) function, a sigmoid function, or a hyperbolic tangent function (tanh function), etc. The ReLU function is an unsaturated nonlinear function, and the sigmoid function and the tanh function are saturated nonlinear functions. For instance, the activation layer can be used alone as one layer of the CNN, or the activation layer can also be included in a convolution layer (for instance, the first convolution layer 201 may include the first activation layer 203, and the second convolution layer 202 may include the second activation layer 204).

For instance, in the first convolution layer 201, firstly, the output of the first convolution layer 201 is obtained by applying a plurality of convolution kernels $w_{ij}^1$ in the first set of convolution kernels and a plurality of bias $b_i^1$ in the first set of bias to each input; and then, the output of the first convolution layer 201 can be processed by the first activation layer 203, so as to obtain the output of the first activation layer 203. In the second convolution layer 202, firstly, the output of the second convolution layer 202 is obtained by applying a plurality of convolution kernels $w_{ij}^2$ in the second set of convolution kernels and a plurality of bias $b_i^2$ in the second set of bias to the output of the first activation layer 203 being inputted; and then, the output of the second convolution layer 202 can be processed by the second activation layer 204, so as to obtain the output of the second activation layer 204. For instance, the output of the first convolution layer 201 may be a result of applying the convolution kernels $w_{ij}^1$ to the input of the first convolution layer 201 and then adding the bias $b_i^1$, and the output of the second convolution layer 202 may be a result of applying the convolution kernels $w_{ij}^2$ to the output of the first activation layer 203 and then adding the bias $b_i^2$.

The CNN needs to be trained before being used for image processing. After being trained, the convolution kernels and the bias of the CNN remain unchanged during image processing. In the training process, the convolution kernels and the bias are adjusted by multiple sets of input/output sample images and optimization algorithms, so as to obtain an optimized CNN model.

Figure 4:
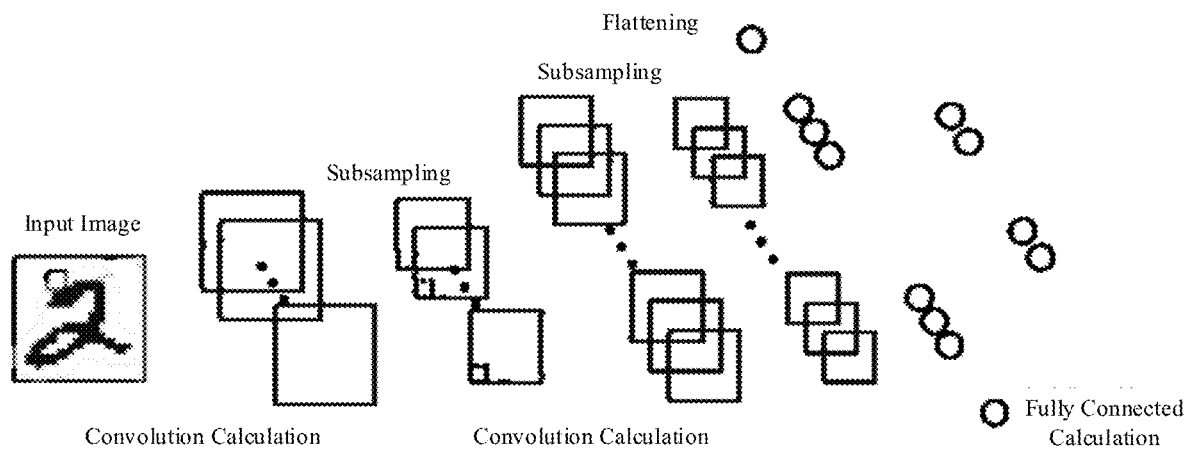
FIG. 4 is a schematic diagram of a working process of a convolutional neural network.

FIG. 4 is a schematic diagram illustrating a working process of a CNN. For instance, as shown in FIG. 4, after an input image is inputted to the CNN through an input layer, a corresponding output is obtained after several processing procedures (such as convolution calculation, subsampling (i.e., down-sampling), flattening, fully connected calculation, etc.). The CNN can mainly include multiple convolution layers, multiple down-sampling layers (i.e., subsampling layers), a flatten layer and a fully connected layer. In the present disclosure, it should be understood that each of the layers including the plurality of convolution layers, the plurality of down-sampling layers, the flatten layer and the fully connected layer, etc., refers to a corresponding process/operation, such as a convolution process/operation (as shown by convolution calculation in FIG. 4), down-sampling process/operation (as shown by down-sampling in FIG. 4), flattening process/operation (as shown by flattening in FIG. 4), fully connected process/operation (as shown by fully connected calculation in FIG. 4), etc., which will not be repeated in the following. It should be noted that in the present disclosure, these layers used to refer to corresponding processes/operations are collectively referred to as functional layers, so as to be distinguished from neuron layers. It should also be noted that the functional layers can also include an up-sampling layer, a normalization layer, etc., without being limited in the embodiments of the present disclosure.

The convolution layer is the core layer of the CNN. In the convolution layer of the CNN, one neuron is only connected to some neurons of an adjacent layer. The convolution layer can apply a number of convolution kernels (also referred to as filters) to an input image, so as to extract multiple types of features of the input image. Each convolution kernel can extract one type of feature. Convolution kernels are generally initialized in the form of a random fractional matrix. During the training process of the CNN, the convolution kernels will obtain reasonable weights through learning. The result obtained by applying a convolution kernel to the input image is called a feature map, and the number of feature maps is equal to the number of convolution kernels. Each feature map consists of a number of neurons in rectangular arrangement. The neurons of a same feature map share weights, and the weights shared here are convolution kernels. The feature image outputted by the convolution layer of one stage can be inputted to the adjacent convolution layer of next stage and to be processed again to obtain a new feature map. For example, as shown in FIG. 4, the convolution layer of the first stage can output a first feature map, which is inputted to the convolution layer of the second stage and is processed again to obtain a second feature map.

For instance, as shown in FIG. 4, the convolution layer can perform convolution on data of a certain local perception field of the input image by using different convolution kernels; the convolution result is inputted to the activation layer, and the activation layer performs computing according to corresponding activation function, so as to obtain feature information of the input image.

For instance, as shown in FIG. 4, the down-sampling layer is disposed between adjacent convolution layers, and the down-sampling layer is one form of down-sampling. On one hand, the down-sampling layer can be used to reduce the size of the input image, simplify the computing complexity, and reduce the over-fitting phenomenon to a certain extent. On the other hand, the down-sampling layer can also perform feature compression to extract main features of the input image. The down-sampling layer can reduce the size of the feature image, but does not change the number of feature maps. For example, if an input image with a size of 12×12 is sampled by a 6×6 convolution kernel, a 2×2 output image can be obtained, which means that 36 pixels on the input image are combined into 1 pixel in the output image. The output of the final down-sampling layer can be inputted to a flattening layer to be flattened. The flattening layer can convert a feature image (2D image) into a vector (1D). The flattening operation can be performed in the following manner:

$$v_k = f_{k/j,k\%j}$$

where v is a vector including k elements, and f is a matrix with i rows and j columns.

Then, the output (namely 1D vector) of the flattening layer is inputted to a fully connected layer (FCN). The fully connected layer can have the same structure with the CNN shown in FIG. 3, but the difference is that the fully connected layer uses different scalar values instead of convolution kernels. The fully connected layer is configured to connect all extracted features. The output of the fully connected layer can be a 1D vector.

The calculation procedures such as the convolution calculation and the fully connected calculation and the like in the CNN mainly include multiply-accumulate calculations. Therefore, functional layers such as convolution layer and fully connected layer, etc., can be realized through memristor arrays. For example, the weights of the convolution layer and the weights of the fully connected layer can both be expressed by the array conductances of a memristor array, and the inputs of the convolution layer and the inputs of the fully connected layer can both be expressed by corresponding voltage excitations, so that the convolution calculation and the fully connected calculation can be respectively realized according to Kirchhoff's law.

Figure 5A:
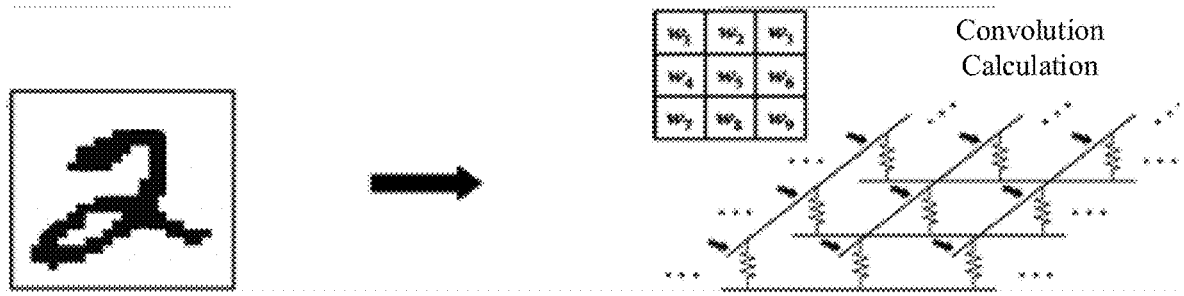
FIG. 5A is a schematic diagram of convolution calculation of a convolution neural network based on a memristor array.
Figure 5B:
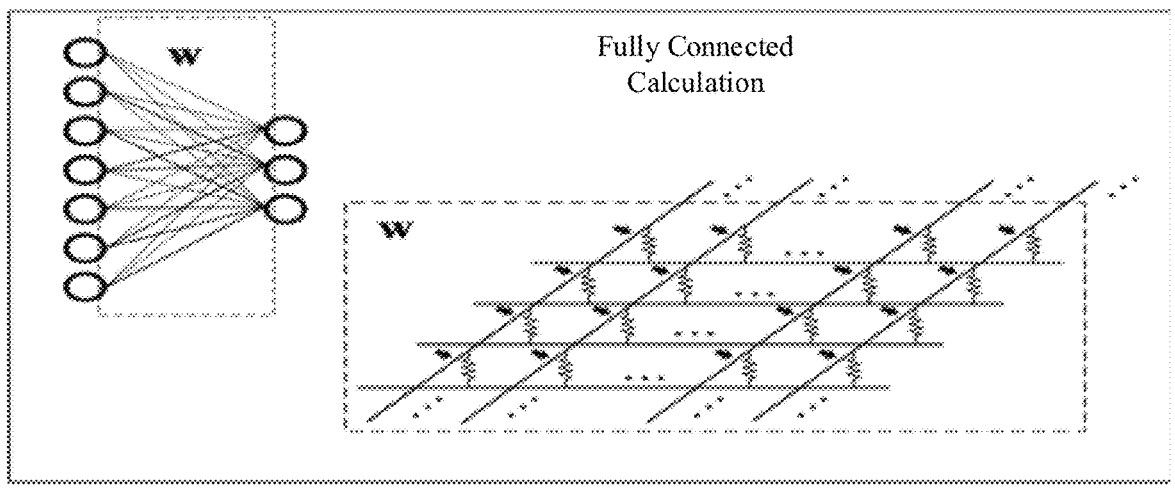
FIG. 5B is a schematic diagram of fully connected calculation of a convolutional neural network based on a memristor array.

FIG. 5A is a schematic diagram of convolution calculation of a convolution neural network based on a memristor array, and FIG. 5B is a schematic diagram of fully connected calculation of a convolutional neural network based on a memristor array.

As shown in FIG. 5A, a memristor array can be used to realize the convolution calculation of a convolution layer, and for example, the memristor array can perform a convolution processing on an input image (as shown by a digital image "2" in FIG. 5A). For example, in some examples, the convolution layer includes a plurality of kernels, each row of the memristor array corresponds to one kernel, and the plurality of memristors in each row are used to represent values of respective elements of one kernel. For example, for a 3×3 kernel, each row of the memristor array adopts 9 memristors to represent the values of 9 elements of the kernel. It should be noted that the above implementation of the convolution layer using the memristor array is illustrative, and the embodiments of the present disclosure include but are not limited to this case.

It should be understood that when the convolution layer performs convolution processing on an input image thereof, the input image needs to be split into a plurality of image patches (the size of each image patch is the same as that of the kernel), and then a convolution operation is performed on each image patch by using the kernels. In the case where the convolution operation of the convolution layer is implemented by using the memristor array, although the plurality of kernels can process each image patch in parallel, it is still necessary to serially input the data of respective image patches into the memristor array in batches (i.e., the image patches are inputted one by one), so as to realize the convolution processing on the entire input image.

As shown in FIG. 5B, a memristor array can be used to realize the fully connected calculation of a fully connected layer. For example, in some examples, as shown in FIG. 5B, each column of the memristor array is configured to receive the input of the fully connected layer, each row of the memristor array is configured to provide the output of the fully connected layer, and the plurality of memristors in each row are used to represent respective weights corresponding to the output of the row. It should be noted that the above implementation of the fully connected layer using the memristor array is illustrative, and the embodiments of the present disclosure include but are not limited to this case.

It should be understood that the fully connected calculation of the fully connected layer can be completed at one time. The convolution calculation of the convolution layer needs to be completed serially in batches, and when all batches are processed, the convolution calculation of the convolution layer is completed. Therefore, there is a severe speed mismatch between the convolution calculation and the fully connected calculation (the convolution calculation takes much longer time than the fully connected calculation). Therefore, when implementing a convolutional neural network based on memristor arrays, the performance of the convolutional neural network is often constrained by the memristor array with the lowest efficiency (which is referred to as efficiency bottleneck), such as the memristor array corresponding to the convolution layer.

At least one embodiment of the present disclosure provides a parallel acceleration method for a memristor-based neural network. The neural network includes a plurality of functional layers sequentially provided, the plurality of functional layers include a first functional layer and a second functional layer following the first functional layer, the first functional layer includes a plurality of first memristor arrays in parallel, and the plurality of first memristor arrays are configured to execute an operation of the first functional layer in parallel and to output a result of the operation to the second functional layer. The parallel acceleration method includes: executing the operation of the first functional layer in parallel via the plurality of first memristor arrays and outputting the result of the operation to the second functional layer.

At least one embodiment of the present disclosure further provides a parallel acceleration processor and a parallel acceleration device corresponding to the parallel acceleration method.

According to the parallel acceleration method of the memristor-based neural network, the parallel acceleration processor based on the memristor-based neural network and the parallel acceleration device based on the memristor-based neural network provided by the embodiments of the disclosure, the operation of the first functional layer is executed in parallel via the plurality of first memristor arrays, thereby achieving the acceleration of the operation process of the memristor-based neural network. The architecture and parallel acceleration method of the memristor-based neural network are applicable for various deep neural network models and different types of memristors, and are helpful for solving the speed mismatch problem of the deep neural network models.

Some embodiments of the present disclosure and examples thereof will be described in detail below with reference to the accompanying drawings.

Figure 6:
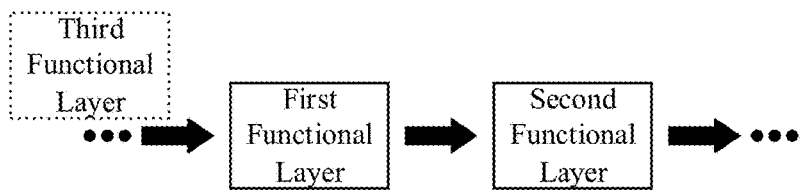
FIG. 6 is a schematic block diagram of the structure of a neural network provided by some embodiments of the present disclosure.

At least one embodiment of the present disclosure provides a parallel acceleration method for a memristor-based neural network. FIG. 6 is a schematic block diagram of the structure of a neural network provided by some embodiments of the present disclosure, FIG. 7A shows a parallel processing manner of the first functional layer in a parallel acceleration method of the neural network shown in FIG. 6, and FIG. 7B shows another parallel processing manner of the first functional layer in the parallel acceleration method of the neural network shown in FIG. 6.

As shown in FIG. 6, the neural network includes a plurality of functional layers arranged in sequence. For example, as shown in FIG. 6, the plurality of functional layers include a first functional layer and a second functional layer following the first functional layer. For example, in some embodiments, the plurality of functional layers can further include functional layers other than the first functional layer and the second functional layer, without being limited in the present disclosure.

Figure 7A:
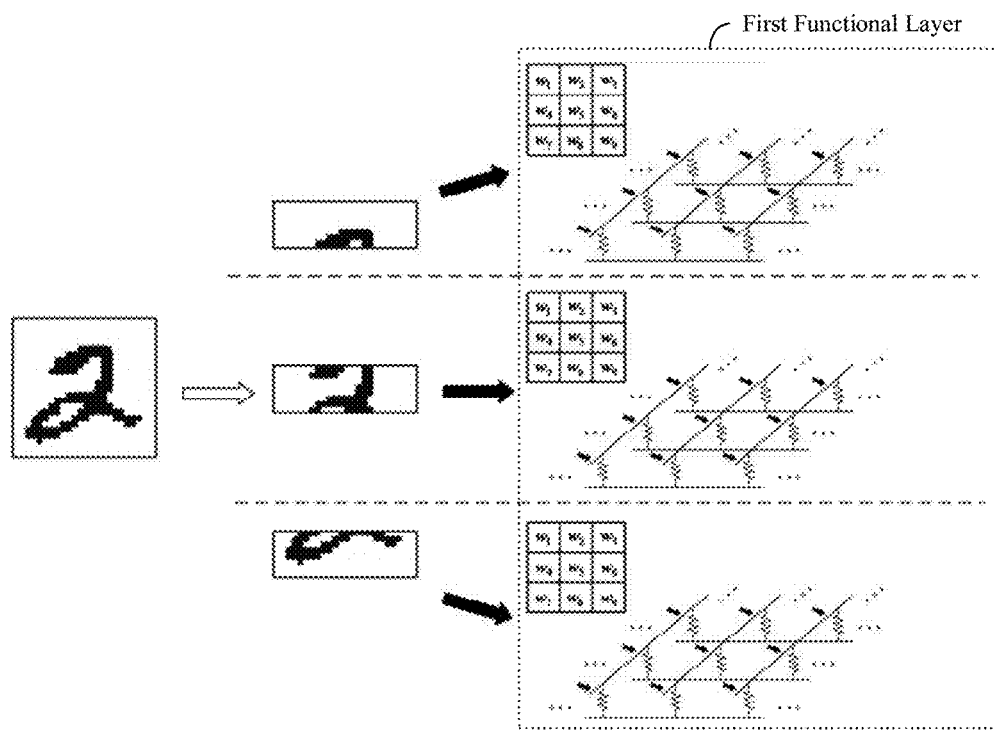
FIG. 7A shows a parallel processing manner of the first functional layer in a parallel acceleration method of the neural network shown in FIG. 6.
Figure 7B:
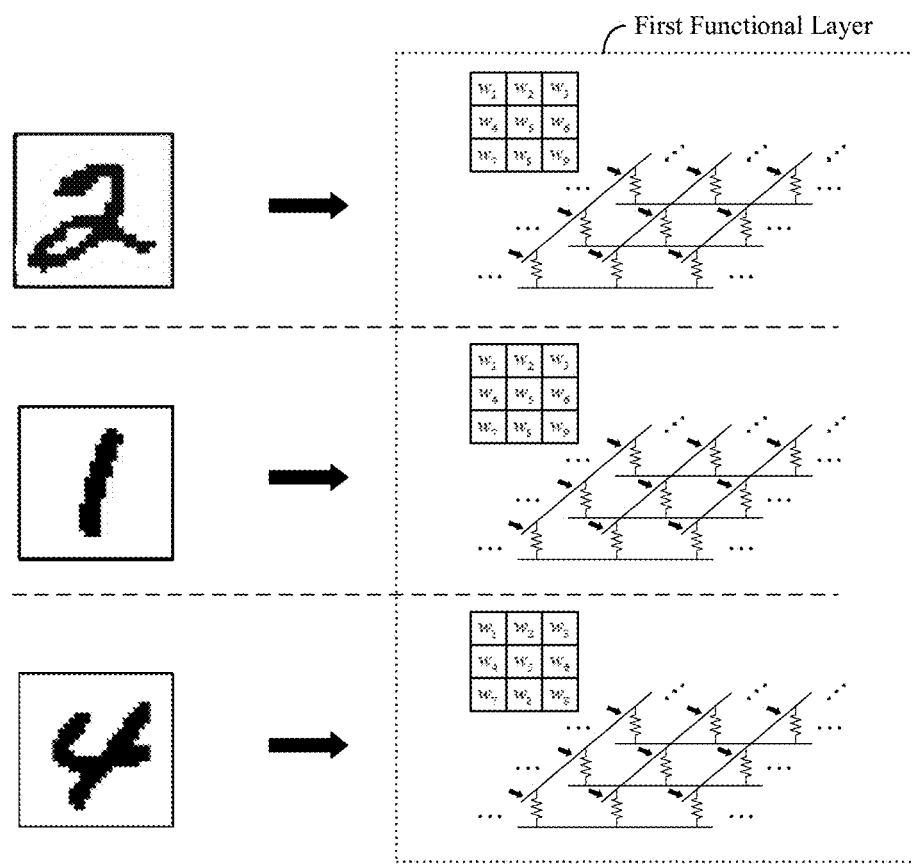
FIG. 7B shows another parallel processing manner of the first functional layer in the parallel acceleration method of the neural network shown in FIG. 6.

For example, in some embodiments, as shown in FIG. 7A and FIG. 7B, the first functional layer includes a plurality of first memristor arrays in parallel, and the plurality of first memristor arrays corresponding to the first functional layer are configured to execute the operation of the first functional layer in parallel and to output the result of the operation to the second functional layer, thereby accelerating the operation process of the neural network. For example, in some embodiments, in the case where the first functional layer includes only one first memristor array, the first functional layer is an efficiency bottleneck constraining the operation performance of the neural network, and for example, the first functional layer is a convolution layer.

For example, in some embodiments, the neural network is a convolutional neural network which includes a plurality of convolution layers. In general, the initial convolution layer (i.e. the first convolution layer) which is used for the convolution processing on the input image of the neural network usually has the largest amount of computation and the longest time consumption, that is, the initial convolution layer is usually the efficiency bottleneck of the neural network. Therefore, the first functional layer may generally include the initial convolution layer. It should be noted that the present disclosure includes but is not limited to this case. For example, in some other embodiments, as shown in FIG. 6, the plurality of functional layers of the neural network can further include a third functional layer which is located before the first functional layer, and the output of the third functional layer is provided to the first functional layer as the input of the first functional layer, and therefore, the first functional layer can also be a convolution layer other than the initial convolution layer of the neural network, such as an intermediate convolution layer, etc.

It should be understood that the neural network can include a plurality of first functional layers (e.g., convolution layers), and the operation of each first functional layer can be executed in parallel via a plurality of first memristor arrays corresponding to the each first functional layer, thereby improving the parallelism of the neural network and further accelerating the operation process of the neural network. For example, the number of first memristor arrays corresponding to respective first functional layers can be the same or different, without being limited in the embodiments of the present disclosure.

For example, the second functional layer can include one selected from the group consisting of a convolution layer, a down-sampling layer, a flatten layer, a fully connected layer, or the like. For example, the third functional layer can include one selected from the group consisting of a convolution layer, a down-sampling layer, or the like. It should be noted that the embodiments of the present disclosure are not limited to these cases.

For example, FIG. 7A and FIG. 7B both illustratively show a case where the first functional layer includes 3 first memristor arrays, which should not be considered as a limitation to the present disclosure. That is, the number of first memristor arrays included in the first functional layer can be set according to actual needs, without being limited in the embodiments of the present disclosure.

For example, as shown in FIG. 7A and FIG. 7B, the parallel acceleration method of the memristor-based neural network described above includes: executing the operation of the first functional layer in parallel via the plurality of first memristor arrays and outputting the result of the operation to the second functional layer (not shown in FIG. 7A and FIG. 7B).

For example, in some embodiments, as shown in FIG. 7A, firstly, the input data received by the first functional layer (as shown by the digital image "2" in FIG. 7A) can be split into a plurality of sub-input data (as shown by the three parts into which the digital image "2" in FIG. 7A is split) in one-to-one correspondence with the plurality of first memristor arrays; then, the operation of the first functional layer can be performed on the plurality of sub-input data in parallel via the plurality of first memristor arrays, so as to generate a plurality of sub-operation results, correspondingly; and then, the plurality of sub-operation results can be concatenated and the operation of the second functional layer can be performed on the concatenate result via the second functional layer.

For example, in some examples, as shown in FIG. 7A, the first functional layer is a convolution layer, and each first memristor array included in the first functional layer can implement the convolution operation of the first functional layer in the manner shown in FIG. 5A.

For example, in some examples, in the plurality of sub-input images (i.e., sub-input data) obtained by splitting the input image (i.e., input data), adjacent sub-input images may generally overlap with each other or may not overlap with each other, without being limited in the embodiments of the present disclosure. For example, in some examples, the sizes of the plurality of sub-input data are substantially equal to each other, so that the time consumption of the convolution processing on each sub-input data by the corresponding first memristor array is substantially equal to each other, and overall, the processing speed of the first functional layer can be accelerated, that is, the processing speed of the neural network can be accelerated.

For example, in some examples, the plurality of sub-input data can be respectively provided to the plurality of first memristor arrays in any order, and in this case, each first memristor array can process any sub-input data; for example, in some other examples, the plurality of sub-input data should be respectively provided to the plurality of first memristor arrays one by one in a predetermined order, and in this case, each first memristor array can process the sub-input data corresponding thereto.

For example, in the case where the input image is processed via a first memristor array (referring to FIG. 5A), the time consumed for the operation of the first functional layer is denoted as t; for example, in the case where the three sub-input images obtained by splitting the input image are processed in parallel via three first memristor arrays (referring to FIG. 7A), the time consumed for the operation of the first functional layer is reduced to t/3. Therefore, the parallel acceleration method shown in FIG. 7A can accelerate the operation process of the neural network processing a single input data.

For example, in some examples, the second functional layer can be one selected from the group consisting of a convolution layer, a down-sampling layer, a flatten layer, a fully connected layer, or the like, without being limited in the embodiments of the present disclosure.

For example, in some other embodiments, as shown in FIG. 7B, firstly, a plurality of input data received by the first functional layer (as shown by digital images "2", "1" and "4" in FIG. 7B) can be respectively provided to a plurality of first memristor arrays; then, the operation of the first functional layer can be performed on the plurality of input data at least partially in parallel via the plurality of first memristor arrays, so as to generate a plurality of sub-operation results; and then, the operation of the second functional layer can be respectively performed on the plurality of sub-operation results via the second functional layer.

For example, in some examples, as shown in FIG. 7B, the first functional layer is a convolution layer, and each first memristor array included in the first functional layer can implement the convolution operation of the first functional layer in the manner shown in FIG. 5A. For example, the plurality of input data can be allocated to the plurality of first memristor arrays in any order, and in this case, each first memristor array can process any input data. For example, the plurality of input data can be different from each other, or can be partially or completely the same, without being limited in the embodiments of the present disclosure.

For example, in the case where the input image is processed via a first memristor array (referring to FIG. 5A), the time consumed for the operation of the first functional layer is denoted as t1, and the time consumed for the operation of the subsequent functional layer(s) is denoted as t2; and if t1>t2, the time consumed by the neural network to process three input images is at least about 3*t1+t2 (for example, when the first functional layer processes the data of a current input image, the subsequent functional layer(s) can finish processing the relevant data of a previous input image). In contrast, for example, in the case where three input images are processed in parallel via three first memristor arrays (referring to FIG. 7B), the time consumed for processing the three input images by using the neural network is about t1+3*t2, thereby saving a time of 2*(t1−t2). That is, the parallel acceleration method shown in FIG. 7B can accelerate the operation process of the neural network processing a plurality of input data.

It should be understood that the parallel acceleration method shown in FIG. 7A and the parallel acceleration method shown in FIG. 7B can be comprehensively applied to a same neural network (e.g., applied to different first functional layers of the same neural network), without being limited in the embodiment of the present disclosure.

The neural network provided by the embodiments of the present disclosure can be operated by using the parallel acceleration method described above. And in the operation process thereof, the operation of the first functional layer is executed in parallel via a plurality of first memristor arrays, thereby achieving the acceleration of the operation process of the neural network. The architecture of the neural network and the parallel acceleration method thereof are applicable for various deep neural network models and different types of memristors, and are helpful for solving the speed mismatch problem of the deep neural network models.

At least one embodiment of the present disclosure further provides an ex-situ training method of a memristor-based neural network. For example, the training method can be used to obtain the parameters of the neural network provided by the above embodiments. For example, referring to FIG. 6, FIG. 7A and FIG. 7B, the neural network includes a plurality of functional layers sequentially provided, the plurality of functional layers include a first functional layer and a second functional layer following the first functional layer, the first functional layer includes a plurality of first memristor arrays in parallel, and the plurality of first memristor arrays are configured to execute an operation of the first functional layer and to output a result of the operation to the second functional layer.

It should be understood that a training method of a neural network generally includes the following steps: processing a training input data by using the neural network to obtain a training output data; based on the training output data, calculating a loss value of the neural network according to a loss function; tuning the parameters of the neural network according to the loss value; and determining whether the training of the neural network meets a predetermined condition or not, and if the predetermined condition is not met, repeating the above training process, otherwise, stopping the above training process and obtaining a trained neural network. Of course, when training the neural network, the parameters of the neural network usually need to be initialized. For example, the parameters of the neural network can be initialized into random numbers; for example, the random numbers conform to Gaussian distribution, and the embodiments of the present disclosure are not limited to this case. It should be understood that the training method of the neural network provided by the embodiments of the present disclosure can also be referred to the commonly used training steps and processes described above.

After weight parameters are obtained through ex-situ training, the conductances of the elements in the memristor arrays are programmed by setting and resetting operations to realize the corresponding weights. A specific programming method and an organization manner of memristor weights are not limited.

Figure 8:
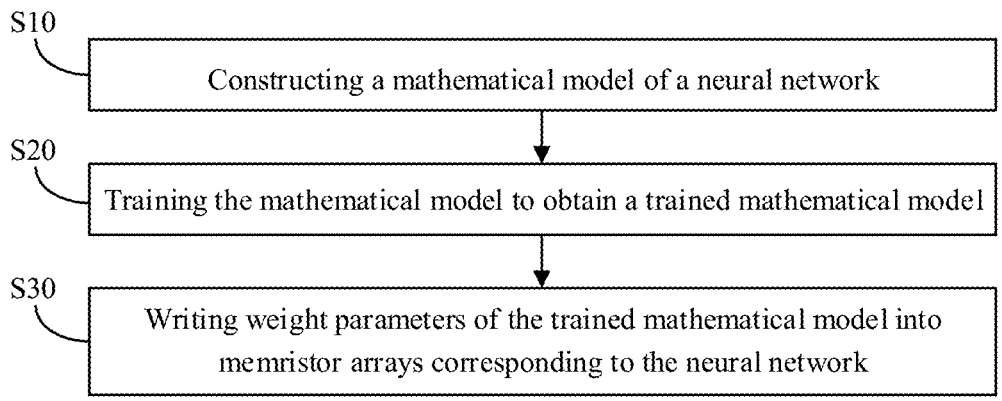
FIG. 8 is a flowchart of an ex-situ training method of a neural network provided by some embodiments of the present disclosure.

FIG. 8 is a flowchart of an ex-situ training method of a neural network provided by some embodiments of the present disclosure. For example, as shown in FIG. 8, the ex-situ training method can include steps S10 to S30 as follows.

Step S10: Constructing a mathematical model of a neural network.

For example, in some examples, the mathematical model provided by the embodiments of the present disclosure can be constructed via software (e.g., program code, etc.).

Step S20: Training the mathematical model to obtain a trained mathematical model.

For example, in some examples, the mathematical model mentioned above can be run and trained based on a processor and a memory, etc. For example, the training steps and processes of the mathematical model can be referred to the commonly used training steps and processes, and details will not be repeated here.

Step S30: Writing weight parameters of the trained mathematical model into memristor arrays corresponding to the neural network.

For example, in some examples, the first functional layer in the mathematical model includes a group of first weight parameters. In the training process of the mathematical model, during forward propagation, a training input data of the first functional layer is processed with the group of first weight parameters; and during backward propagation, the group of first weight parameters are tuned to obtain the trained first weight parameters of the first functional layer. In this case, the writing the weight parameters of the trained mathematical model into the memristor arrays corresponding to the neural network, i.e. step S30, includes: writing the group of first weight parameters of the first functional layer in the trained mathematical model into a plurality of first memristor arrays respectively. In this case, each first memristor array corresponding to the first functional layer includes a same conductance weight matrix.

For example, in some other examples, the first functional layer in the mathematical model includes a plurality of groups of first weight parameters. In the training process of the mathematical model, during forward propagation, the training input data received by the first functional layer in the mathematical model is split into a plurality of training sub-input data in one-to-one correspondence with the plurality of groups of first weight parameters; the operation of the first functional layer is performed on the plurality of training sub-input data in parallel by using the plurality of groups of first weight parameters, so as to generate a plurality of training sub-operation results; and the parameter values of each group of first weight parameters are updated based on a training sub-operation result corresponding to the each group of first weight parameters and the training intermediate data corresponding to the training sub-operation result. According to different manners of ex-situ training, each memristor array can be programed with the same weight parameters or different weight parameters.

In this case, the writing the weight parameters of the trained mathematical model into the memristor arrays corresponding to the neural network, i.e. step S30, includes: writing the plurality of groups of first weight parameters of the first functional layer in the trained mathematical model into the plurality of first memristor arrays in one-to-one correspondence, respectively. In this case, the obtained neural network can be used to execute the parallel acceleration method shown in FIG. 7A.

For example, in still some other examples, the first functional layer in the mathematical model includes a plurality of groups of first weight parameters. In the training process of the mathematical model, during forward propagation, a plurality of training input data received by the first functional layer in the mathematical model are respectively provided to the plurality of first weight parameters; the operation of the first functional layer is performed on the plurality of training input data at least partially in parallel by using the plurality of groups of first weight parameters, so as to generate a plurality of training sub-operation results; and the parameter values of each group of first weight parameters are updated based on a training sub-operation result corresponding to the each group of first weight parameters and the training intermediate data corresponding to the training sub-operation result.

In this case, the writing the weight parameters of the trained mathematical model into the memristor arrays corresponding to the neural network, i.e. step S30, includes: writing the plurality of groups of first weight parameters of the first functional layer in the trained mathematical model into the plurality of first memristor arrays in one-to-one correspondence, respectively. In this case, the obtained neural network can be used to execute the parallel acceleration method shown in FIG. 7B, and can also be used to execute the parallel acceleration method shown in FIG. 7A.

Therefore, in the parallel acceleration method of the memristor-based neural network provided by some embodiments of the present disclosure, the weight parameters of the neural network are obtained through the ex-situ training method described above, the weight parameters of the neural network include the weight parameters of the first functional layer, and the weight parameters of the first functional layer are written into the plurality of first memristor arrays, so as to determine the conductances of the plurality of first memristor arrays. It should also be understood that the weight parameters of the neural network obtained through the ex-situ training method described above can also include weight parameters of functional layers other than the first functional layer, and the weight parameters of the functional layers other than the first functional layer can be written into memristor arrays corresponding to the functional layers other than the first functional layer, so as to determine the conductances of memristor arrays corresponding to the functional layers other than the first functional layer.

Figure 9:
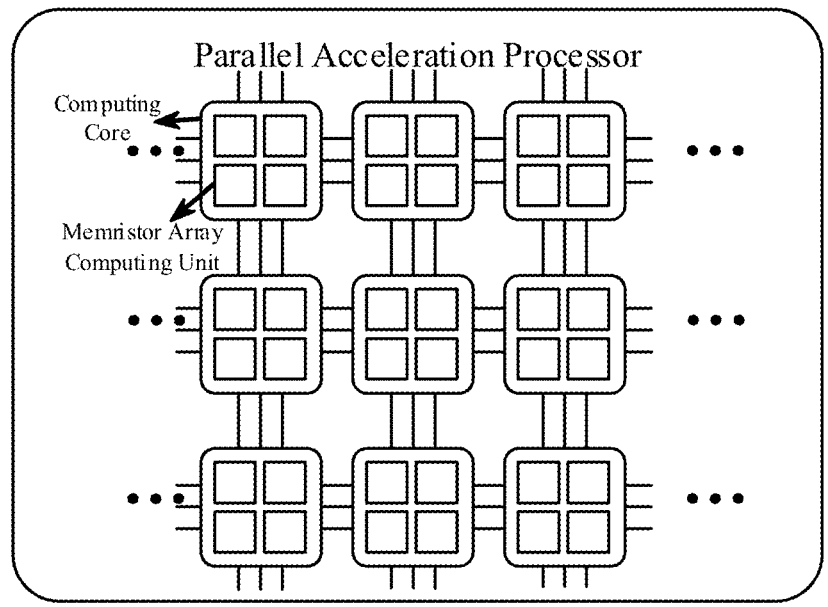
FIG. 9 is a schematic diagram of a parallel acceleration processor based on a memristor-based neural network according to some embodiments of the present disclosure.

At least one embodiment of the present disclosure further provides a parallel acceleration processor based on a memristor-based neural network, and the parallel acceleration processor can be used to execute the parallel acceleration method described above. FIG. 9 is a schematic diagram of a parallel acceleration processor based on a memristor-based neural network provided by some embodiments of the present disclosure.

For example, as shown in FIG. 6, the neural network includes a plurality of functional layers sequentially provided, the plurality of functional layers including a first functional layer. For example, as shown in FIG. 9, the parallel acceleration processor includes a plurality of computing cores, and the computing cores can communicate with each other; and simultaneously, each computing core includes a plurality of memristor array computing units.

For example, in some embodiments, the plurality of memristor array computing units include a plurality of first memristor array computing units, weight parameters of the first functional layer are written into the plurality of first memristor array calculation units, and the plurality of first memristor array computing units are configured to execute computing corresponding to an operation of the first functional layer in parallel. That is to say, the weights of a certain functional layer in the neural network can be programmed into different computing cores or different memristor array computing units, thus realizing a parallel accelerated computing of the operation of the functional layer by using a plurality of memristor arrays. For example, the plurality of first memristor arrays can realize the parallel accelerated computing of the operation of the first functional layer by adopting the parallel acceleration method provided by any one of the above embodiments.

Figure 10:
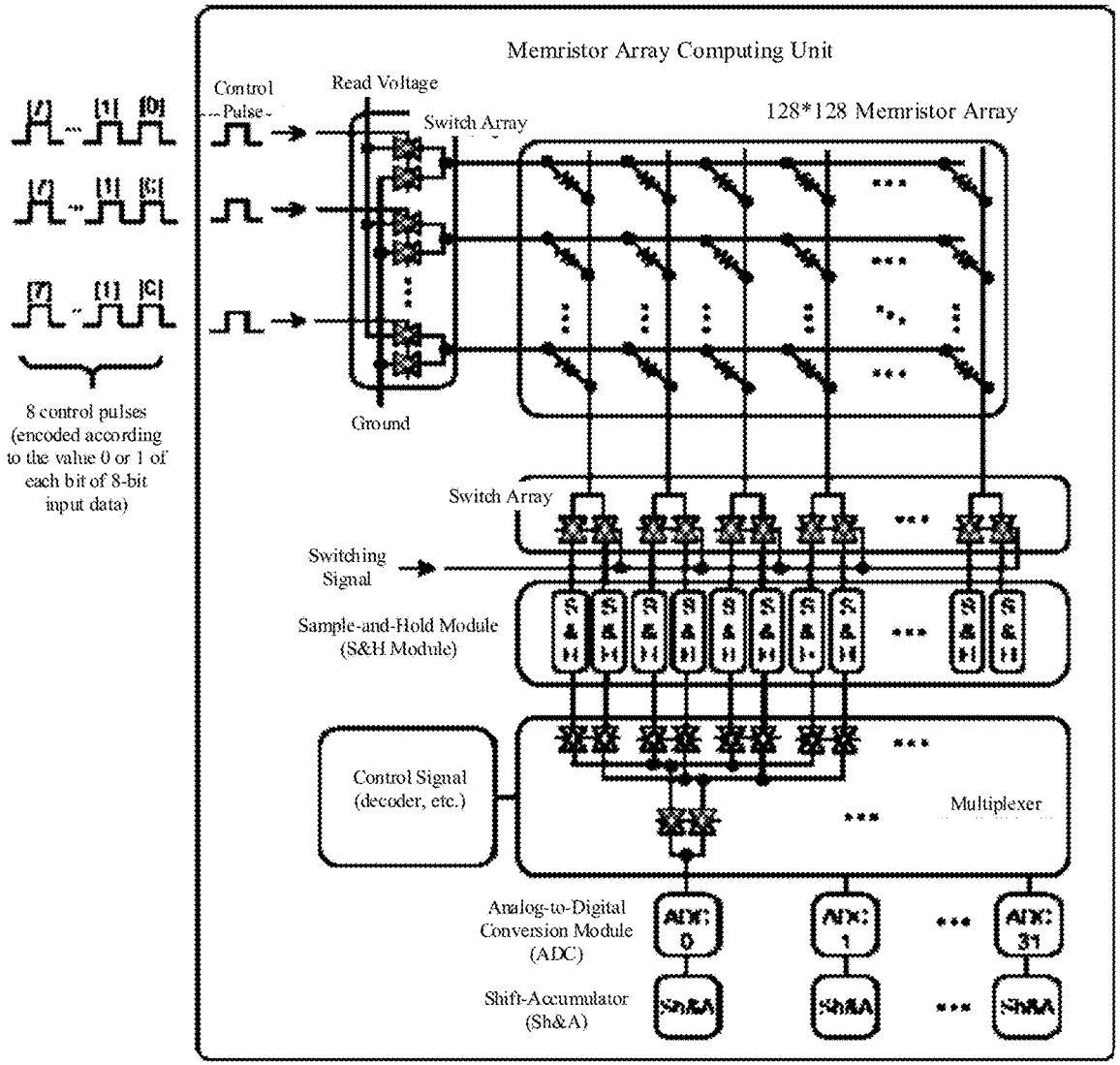
FIG. 10 is a schematic structural diagram of a memristor array computing unit in the parallel acceleration processor shown in FIG. 9.

FIG. 10 is a schematic structural diagram of a memristor array computing unit in the parallel acceleration processor shown in FIG. 9. Hereinafter, the operation principle of the memristor array computing unit will be described in detail with reference to the structure of the memristor array computing unit shown in FIG. 9.

For example, as shown in FIG. 10, the memristor array computing unit includes a memristor array and peripheral circuits.

For example, in some examples, as shown in FIG. 10, the memristor array includes 128×128 memristors, and the embodiments of the present disclosure include, but are not limited to this case. For example, in some examples, as shown in FIG. 10, the peripheral circuits include a switch array, a multiplexer, a sample-and-hold module (S&H module), an analog-to-digital converter module (ADC), a shift-accumulator (Sh&A), etc.

For example, in some examples, as shown in FIG. 10, the input of the memristor array computing unit includes a plurality of 8-bit input data. For example, each bit of each input data corresponds to a control pulse, and each control pulse is encoded according to the value of each bit. A specific encoding method is as follows:

$$V_k = V_R \Sigma_{s=0}^{B-1} (a_{k,s} \cdot 2^s),$$

where $s=0, \ldots, B-1$, and B represents the number of bits of input data (for example, as shown in FIG. 10, B=8), $V_k$ represents a voltage excitation corresponding to the k-th row of input data, $V_R$ represents a constant reference voltage (e.g., a read voltage shown in FIG. 10), $a_{k,s}$ represents a level of the [s]-th control pulse. For example, in some examples, $a_{k,s}$ can correspond to one of binary codes ($a_{k,7}, a_{k,6}, \ldots, a_{k,0}$) of the 8-bit input data $a_k$. In the case where $a_{k,s}=1$, it means that the [s]-th control pulse is at a high level, so that a corresponding switch in the switch array can be turned on, and the read voltage $V_R$ is supplied to the k-th row of the memristor array; in the case where $a_{k,s}=0$, it means that the [s]-th control pulse is at a low level, so that the corresponding switch in the switch array can be turned off, and simultaneously, another switch in the switch array is turned on to supply a ground level to the k-th row of the memristor array, that is, no signal is provided to the k-th row of the memristor array at this time.

It should be understood that, as shown in FIG. 10, on the one hand, a plurality of input data are input into the memristor array in parallel; on the other hand, each input data is correspondingly characterized as a plurality of (e.g., 8) control pulses, which are serially input into the memristor array. Of course, the control pulses of a same order corresponding to different input data are input into the memristor array in parallel.

According to Kirchhoff's law, the output currents of the memristor array can be obtained according to the following formula:

$$i_j = \sum_{k=1}^{m} (V_k g_{k,j})$$
$$= \sum_{k=1}^{m} \left( g_{k,j} V_R \sum_{s=0}^{B-1} (a_{k,s} \cdot 2^s) \right)$$
$$= \sum_{s=0}^{B-1} \left( 2^s \cdot \sum_{k=1}^{m} (g_{k,j} a_{k,s} V_R) \right)$$
$$= \sum_{s=0}^{B-1} (2^s \cdot i_{j,s})$$

where $k=1, \ldots, m$, and $j=1, \ldots, n$, and m represents the number of rows of the memristor array, n represents the number of columns of the memristor array, $i_j$ represents an output current of the j-th column of the memristor array corresponding to all input data, $i_{j,s}$ represents a pulse output current of the j-th column of the memristor array corresponding to all [s]-th control pulses, $g_{k,j}$ represents the conductance matrix of the memristor array.

According to this formula, when all [s]-th control pulses corresponding to all input data are applied to the switch array, the read voltage $V_R$ can be applied to the memristor array in parallel under the control of the high-level control pulses, so that the memristor array correspondingly outputs a plurality of pulse output currents $i_{j,s}$, where $$i_{j,s} \Sigma_{k=1}^{m} (g_{k,j} a_{k,s} V_R).$$

It should be noted that in the embodiment shown in FIG. 10, the pulse output currents corresponding to control pulses of each order are not directly weighted (the weight value corresponding to the pulse output current $i_{j,s}$ is $2^s$) and summed according to the above formula to obtain the output current $i_j$ of the j-th column. For example, as shown in FIG. 10, each pulse output current is converted into a voltage signal that can be held by a sample-and-hold (S&H) module and then quantized into digital information (e.g., binary digital information) by an analog-to-digital conversion module, and finally the binary digital information corresponding to each pulse output current is shifted and accumulated by a shift-accumulator. For example, the binary digital information corresponding to the pulse output current $i_{j,1}$ is moved forward by one bit relative to the binary digital information corresponding to the pulse output current $i_{j,0}$ (i.e., the lowest bit of the former corresponds to the penultimate low bit of the latter), the binary digital information corresponding to the pulse output current $i_{j,2}$ is moved forward by one bit relative to the binary digital information corresponding to the pulse output current $i_{j,1}, \ldots,$ and so on.

For example, in some embodiments, as shown in FIG. 10, the output of each column of the memristor array can be alternately converted by two sets of sample-and-hold modules, thereby increasing the parallelism in hardware operation. At the same time, in order to save the power consumption and the area of the processor chip, the analog-to-digital conversion module (ADC) can work in a time-division multiplexing manner, and for example, outputs of four columns share one analog-to-digital conversion module. When the memristor array computing unit works, if the [s]-th bit (i.e. [s]-th control pulse) is taken as the input signal of the computing unit at the current moment, the switch array is controlled by a switching signal to gate the first set of sample-and-hold modules, and the pulse output currents on the columns are simultaneously converted into corresponding voltage outputs; and at the same time, the analog-to-digital conversion module, assisted by the multiplexer, quantizes the pulse output currents of a previous moment (that is, the moment corresponding to the [s−1]-th control pulse) at a high speed. Then, at a next moment, the [s+1]-th bit (i.e. [s+1]-th control pulse) is taken as the input signal of the computing unit, and the switch array is controlled by the switching signal to gate the second set of sample-and-hold modules, and at the same time, the analog-to-digital conversion module quantizes the voltage value held by the first set of sample-and-hold modules before. For example, during the operation process of the memristor array computing unit, all switch switching operations can be realized by controlling the multiplexer.

It should be noted that both the parallel acceleration processor shown in FIG. 9 and the memristor array computing unit shown in FIG. 10 are illustrative, and specific implementation manners and details of them are not limited in the embodiments of the present disclosure.

The technical effects of the parallel acceleration processor provided by the embodiments of the present disclosure can be referred to the related description of the parallel acceleration method provided by the above embodiments, and details will not be repeated here.

Figure 11:
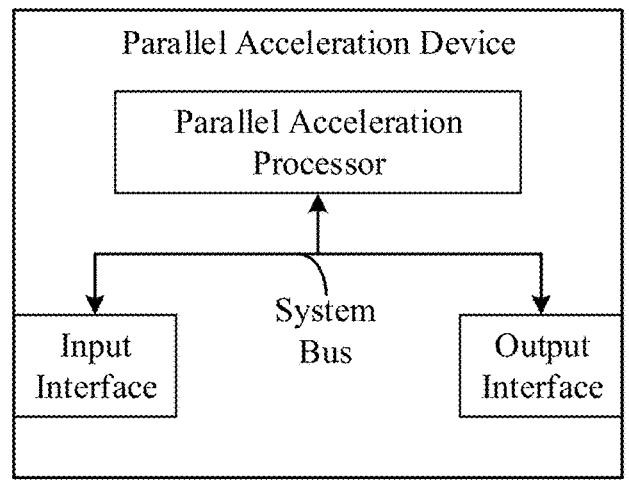
FIG. 11 is a schematic block diagram of a parallel acceleration device based on a memristor-based neural network provided by some embodiments of the present disclosure.

At least one embodiment of the present disclosure further provides a parallel acceleration device based on a memristor-based neural network. FIG. 11 is a schematic block diagram of a parallel acceleration device based on a memristor-based neural network provided by some embodiments of the present disclosure. For example, as shown in FIG. 11, the parallel acceleration device includes the parallel acceleration processor provided by the above embodiment, and an input interface and an output interface which are coupled to the parallel acceleration processor. For example, the parallel acceleration device can execute the parallel acceleration method described above via the parallel acceleration processor therein.

For example, in some examples, as shown in FIG. 11, the parallel acceleration device can further include a system bus through which the parallel acceleration processor, the input interface and the output interface can communicate with each other. For example, the input interface is configured to receive an instruction from an external computer device or a user, etc., to control an operation of the parallel acceleration processor, etc. For example, the output interface is configured to output a result of the operation of the parallel acceleration processor or the like. For example, the external devices that communicate with the parallel acceleration device through the input interface and/or the output interface can be included in an environment that provides a user interface of any type with which the user can interact with the external devices. Examples of the types of user interfaces include graphical user interface (GUI), natural user interface, etc. For example, the GUI can receive an input from a user via an input device such as a keyboard, a mouse, a remote controller, and the like, and provide an output on an output device such as a display. In addition, the natural user interface can enable a user to interact with the parallel acceleration device in a manner that is not constrained by input devices such as keyboards, mice and remote controllers. In contrast, the natural user interface can rely on voice recognition, touch and stylus recognition, gesture recognition on and near the screen, aerial gesture, head and eye tracking, speech and semantics, vision, touch, gesture, and machine intelligence, etc.

Moreover, although the parallel acceleration device is shown as an individual system in FIG. 11, it should be understood that the parallel acceleration device can also be a distributed system and can also be deployed as a cloud facility (including public cloud or private cloud). Thus, for example, a plurality of devices can communicate with each other via network connection and execute the tasks that are described to be executed by the parallel acceleration device together.

For example, the operation process of the parallel acceleration method can be referred to relevant description of the parallel acceleration method in the above embodiments, and details will not be repeated here.

It should be noted that the parallel acceleration device provided by the embodiments of the present disclosure is illustrative but not limitative, and the parallel acceleration device can also include other conventional components or structures according to actual application requirements. For example, in order to implement necessary functions of the parallel acceleration device, those skilled in the art can set other conventional components or structures according to specific application scenarios, which are not limited in the embodiments of the present disclosure.

The technical effects of the parallel acceleration device provided by the embodiments of the present disclosure can be referred to the related description of the parallel acceleration method and the parallel acceleration processor in the above embodiments, and details will not be repeated here.

For the present disclosure, the following statements should be noted:

(1) The accompanying drawings related to the embodiment(s) of the present disclosure involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, and the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be determined based on the protection scope of the claims.

What is claimed is:

1. A parallel acceleration method for a memristor-based neural network, wherein the memristor-based neural network comprises a plurality of functional layers sequentially provided, the plurality of functional layers comprise a first functional layer and a second functional layer following the first functional layer, the first functional layer comprises a plurality of first memristor arrays in parallel, the plurality of first memristor arrays are configured to independently execute an operation of the first functional layer in parallel and to output a plurality of results of the operation to the second functional layer, weight parameters of the memristor-based neural network comprise a plurality of weight parameters of the first functional layer, and the plurality of weight parameters of the first functional layer are written into the plurality of first memristor arrays in one-to-one correspondence, respectively, so as to determine conductances of the plurality of first memristor arrays, and the parallel acceleration method comprises:
splitting an input data received by the first functional layer into a plurality of sub-input data in one-to-one correspondence with the plurality of first memristor arrays; and independently executing the operation of the first functional layer on the plurality of sub-input data in parallel via the plurality of first memristor arrays, so as to correspondingly generate a plurality of sub-operation results, wherein the plurality of results of the operation comprises the plurality of sub-operation results, wherein the weight parameters of the memristor-based neural network further comprise a plurality of weight parameters of functional layers other than the first functional layer, and the plurality of weight parameters of the functional layers other than the first functional layer are written into memristor arrays corresponding to the functional layers other than the first functional layer, so as to determine conductances of the memristor arrays corresponding to the functional layers other than the first functional layer.

2. The parallel acceleration method according to claim 1, further comprising:
concatenating the plurality of sub-operation results to obtain a concatenate result and executing an operation of the second functional layer on the concatenate result via the second functional layer.

3. The parallel acceleration method according to claim 2, wherein sizes of the plurality of sub-input data are substantially equal to each other.

4. The parallel acceleration method according to claim 1, wherein sizes of the plurality of sub-input data are substantially equal to each other.

5. The parallel acceleration method according to claim 1, wherein independently executing the operation of the first functional layer on the plurality of sub-input data in parallel via the plurality of first memristor arrays, so as to correspondingly generate a plurality of sub-operation results, comprises:
providing the plurality of sub-input data received by the first functional layer to the plurality of first memristor arrays respectively; and
executing the operation of the first functional layer on the plurality of sub-input data at least partially in parallel via the plurality of first memristor arrays, so as to correspondingly generate the plurality of sub-operation results, wherein the plurality of results of the operation comprises the plurality of sub-operation results.

6. The parallel acceleration method according to claim 5, further comprising:
executing an operation of the second functional layer on the plurality of sub-operation results via the second functional layer.

7. The parallel acceleration method according to claim 6, wherein the plurality of sub-input data are different from each other.

8. The parallel acceleration method according to claim 5, wherein the plurality of sub-input data are different from each other.

9. The parallel acceleration method according to claim 1, wherein the memristor-based neural network implements a convolutional neural network.

10. The parallel acceleration method according to claim 9, wherein the first functional layer is an initial convolution layer of the memristor-based neural network.

11. The parallel acceleration method according to claim 1, wherein the plurality of functional layers further comprise a third functional layer, and an output of the third functional layer is provided to the first functional layer.

12. The parallel acceleration method according to claim 1, wherein the weight parameters of the memristor-based neural network are obtained through ex-situ training.

13. A parallel acceleration processor based on a memristor-based neural network, wherein the memristor-based neural network comprises a plurality of functional layers sequentially provided, the plurality of functional layers comprise a first functional layer, the parallel acceleration processor comprises a plurality of memristor array computing units, the plurality of memristor array computing units comprise a plurality of first memristor array computing units, the plurality of first memristor array computing units are configured to independently execute computing on a plurality of sub-input data split from an input data received by the first functional layer corresponding to an operation of the first functional layer in parallel, and
wherein weight parameters of the memristor-based neural network comprise a plurality of weight parameters of the first functional layer, and the plurality of weight parameters of the first functional layer are written into the plurality of first memristor array computing units in one-to-one correspondence, respectively, so as to determine conductances of the plurality of first memristor array computing units, and
wherein the weight parameters of the memristor-based neural network further comprise a plurality of weight parameters of functional layers other than the first functional layer, and the plurality of weight parameters of the functional layers other than the first functional layer are written into memristor array computing units of the plurality of memristor array computing units corresponding to the functional layers other than the first functional layer, so as to determine conductances of the memristor array computing units corresponding to the functional layers other than the first functional layer.

14. A parallel acceleration device based on a memristor-based neural network, comprising:
a parallel acceleration processor based on the memristor-based neural network, wherein the memristor-based neural network comprises a plurality of functional layers sequentially provided, the plurality of functional layers comprise a first functional layer, the parallel acceleration processor comprises a plurality of memristor array computing units, the plurality of memristor array computing units comprise a plurality of first memristor array computing units, the plurality of first memristor array computing units are configured to independently execute computing on a plurality of sub-input data split from an input data received by the first functional layer corresponding to an operation of the first functional layer in parallel; and
an input interface and an output interface which are coupled to the parallel acceleration processor,
wherein the input interface is configured to receive an instruction to control an operation of the parallel acceleration processor, and the output interface is configured to output a plurality of results of the operation of the parallel acceleration processor,
wherein weight parameters of the memristor-based neural network comprise a plurality of weight parameters of the first functional layer, and the plurality of weight parameters of the first functional layer are written into the plurality of first memristor array in one-to-one correspondence, respectively, so as to determine conductances of the plurality of first memristor arrays, and
wherein the weight parameters of the memristor-based neural network further comprise a plurality of weight parameters of functional layers other than the first functional layer, and the plurality of weight parameters of the functional layers other than the first functional layer are written into memristor array computing units of the plurality of memristor array computing units corresponding to the functional layers other than the first functional layer, so as to determine conductances of the memristor array computing units corresponding to the functional layers other than the first functional layer.

\* \* \* \* \*